United States Patent
Richard (10) Patent No.: US 6,785,551 B1
(45) Date of Patent: Aug. 31, 2004

(54) METHOD OF PROVIDING DYNAMIC REGIONALLY RELEVANT DATA TO A MOBILE ENVIRONMENT

(75) Inventor: David Andrew Richard, Brighton, MI (US)

(73) Assignee: Ford Motor Company, Dearborn, MI (US)

(*) Notice: Subject to any disclaimer, the term of this patent is extended or adjusted under 35 U.S.C. 154(b) by 0 days.

(21) Appl. No.: 09/545,690

(22) Filed: Apr. 7, 2000

(51) Int. Cl.[7] ................................................ H04Q 7/20
(52) U.S. Cl. ........................ 455/456.1; 455/456.3; 455/414.1; 455/457; 455/12.1; 340/995.24
(58) Field of Search .................... 455/414.1, 456.1, 455/457, 422.1, 12.1, 13.1, 3.06; 701/213, 200; 340/995.24, 988

(56) References Cited

U.S. PATENT DOCUMENTS

| | | | |
|---|---|---|---|
| 5,319,673 A | | 6/1994 | Briskman |
| 5,572,204 A | | 11/1996 | Timm et al. |
| 5,686,910 A | | 11/1997 | Timm et al. |
| 5,687,215 A | | 11/1997 | Timm et al. |
| 5,767,795 A | | 6/1998 | Schaphorst |
| 5,781,101 A | | 7/1998 | Stephen et al. |
| 5,801,751 A | | 9/1998 | Sklar et al. |
| 5,802,492 A | * | 9/1998 | DeLorme et al. ........... 455/456 |
| 5,844,636 A | | 12/1998 | Joseph et al. |
| 5,847,645 A | | 12/1998 | Boesch |
| 5,864,579 A | | 1/1999 | Briskman |
| 5,890,061 A | | 3/1999 | Timm et al. |
| 5,926,126 A | | 7/1999 | Engelman |
| 5,938,721 A | * | 8/1999 | Dussell et al. ............... 701/211 |
| 5,959,577 A | * | 9/1999 | Fan et al. ............... 342/357.13 |
| 5,964,491 A | | 10/1999 | Marsh et al. |
| 6,012,012 A | | 1/2000 | Fleck et al. |
| 6,034,507 A | | 3/2000 | Ikawa et al. |
| 6,091,956 A | * | 7/2000 | Hollenberg .............. 455/456.5 |
| 6,169,897 B1 | * | 1/2001 | Kariya ..................... 455/456.3 |
| 6,438,561 B1 | * | 8/2002 | Israni et al. .............. 707/104.1 |
| 6,580,904 B2 | * | 6/2003 | Cox et al. ................. 455/456.2 |
| 6,650,902 B1 | * | 11/2003 | Richton .................... 455/456.3 |
| 6,725,049 B1 | * | 4/2004 | Williams .................. 455/456.1 |
| 6,741,188 B1 | * | 5/2004 | Miller et al. .............. 340/995.1 |
| 2003/0069029 A1 | * | 4/2003 | Dowling et al. ............. 455/456 |
| 2003/0152200 A1 | * | 8/2003 | Bruce et al. ............. 379/88.18 |

FOREIGN PATENT DOCUMENTS

EP 0978706 A2 2/2000

* cited by examiner

*Primary Examiner*—William Trost
*Assistant Examiner*—Sharad Rampuria (57) ABSTRACT

A dynamic method of delivering regionally relevant information to a plurality of geographically disperse and mobile environments, such as, for example, motor vehicles, allows passengers to immediately access regionally relevant information, such as weather, traffic, points of interest, restaurants, advertisements for local establishments, etc., without incurring expensive air-time from connecting through cellular infrastructure. The invention utilizes a filtering process referred to herein as dynamic geo filter/fencing (DGFF). This involves a receiver element in a mobile environment, such as a motor vehicle, taking a geo-code reading (e.g., latitude and longitude readings obtained from a GPS satellite via a GPS receiver) for identifying the location of the vehicle, then logically drawing a fence around that location reading, for example two miles square. At a separate location (e.g., a satellite uplink facility) regionally relevant data is tagged with the geo-code of the region to which the data is relevant, then broadcast (e.g., over a satellite link) to a wide footprint. The aforementioned receiver element receives the geo-coded regionally relevant information and filters it using the aforementioned logical fence according to the aforementioned DGFF process. Thus, received information bearing a geo-code within the logical fence is kept and processed, while information bearing a geo-code falling outside of the logical fence is not kept and processed. The inventive methodology is dynamic in that the fence automatically moves as the mobile environment moves, thereby automatically changing the nature and content of the information that is allowed to pass through the DGFF filter.

19 Claims, 4 Drawing Sheets

METHOD OF PROVIDING DYNAMIC REGIONALLY RELEVANT DATA TO A MOBILE ENVIRONMENT

TECHNICAL FIELD

The present invention relates in general to providing services to individuals in a mobile environment. More particularly, it relates to an efficient process for dynamically providing geographically relevant information to individuals in a mobile environment, such as, for example, a motor vehicle.

BACKGROUND OF THE INVENTION

Efficient, fast and cost effective access to information is extremely important to a wide variety of consumers in today's marketplace. For example, the use of networked personal computers to access and/or exchange information has changed the way many industries do business. Consumer's can use a variety of networked communication tools, such as the Internet and company-based "Intranets," to obtain information on every subject from automobiles to zebras. The proliferation of wireless communications technology, such as cellular telephony and personal communications systems (PCS), has extended information access beyond the home and office to remote and/or mobile locations.

One example is a vehicular emergency message system of the type described in U.S. Pat. No. 5,890,061. The '061 patent describes a system in which a global positioning system (GPS) receiver is utilized in conjunction with a cellular telephone unit to provide positioning information to emergency service providers over a cellular link. In U.S. Pat. No. 6,012,012, so called "floating car data" (which includes, inter alia, position information from, for example, a GPS receiver) is gathered at a moving vehicle and transmitted over a mobile wireless system to a control center. The control center uses the transmitted information to judge traffic patterns and congestion, and provides the traffic information to the moving vehicles over the same mobile wireless system. In U.S. Pat. No. 5,767,795, a GPS-based information system is used to act as an electronic tour guide to overcome the monotony of automobile trips. The system includes a GPS receiver, a computer, and a database of pre-recorded information, all of which may be contained in one housing and permanently installed in the vehicle. The database contains information pertaining to various geographical regions. The computer receives a signal from the GPS receiver indicating the position of the vehicle. The computer then retrieves information from the database, the retrieved information corresponding to the position determined by the GPS receiver. The information is presented to the traveler, either on a video display or through an audio playback unit. The system can therefore provide information on the history, geography, and/or culture, relating to the region through which the vehicle is traveling.

While useful, the above-described systems suffer from several shortcomings. For example, the '795 patent provides regionally relevant information to a motor vehicle, but has no network links for carrying out any meaningful real time information exchange to and from locations outside the vehicle. The '061 and '012 patents provide network links, however they use wireless telephony paths to communicate information to and from the vehicle, thereby incurring air-time charges and requiring the time consuming and relatively inefficient step of making a telephone call to establish the communications link.

Other systems provide information to users on a broadcast basis—for example, the direct-to-home satellite systems used by companies such as DIRECTV and Dish Network, or the digital radio broadcast system used by the Sirius Satellite Radio Company. These systems don't generally have the problems associated with relying on a cellular link for data transmission (no airtime charges, and "always on" without needing a phone call to establish the link) but they are not dynamic, i.e., you get what they send and what you are authorized to receive. For example, a user will typically be required to have authorization codes that match the authorization codes in the incoming data in order for the data to be received and processed. If there is a match, the received data packet is passed for processing. If there is no match between the authorized code in the data and the authorization codes at the receiver station, the data falls on the floor.

Accordingly, there is a need for an efficient, simple and cost effective method of dynamically providing geographically relevant information to a mobile environment, such as, for example, a motor vehicle.

SUMMARY OF THE INVENTION

The present invention provides an efficient and dynamic method of delivering services to a mobile environment. More particularly, it provides a dynamic method of delivering regionally relevant information to a plurality of geographically disperse and mobile environments, such as, for example, motor vehicles. Accordingly, the invention allows passengers in an automobile to immediately access regionally relevant information, such as weather, traffic, points of interest, restaurants, advertisements for local establishments, etc., without incurring expensive air-time from connecting through cellular telephony infrastructure. The invention utilizes a filtering process referred to herein as dynamic geo filter/fencing (DGFF). This involves a receiver element in a mobile environment, such as a motor vehicle, taking a geocode reading (e.g., latitude and longitude readings obtained from a GPS satellite via a GPS receiver) for identifying the location of the vehicle, then logically drawing a fence around that location reading, for example two miles square. At a separate location (e.g., a satellite uplink facility) regionally relevant data is tagged with the geocode of the region to which the data is relevant, then broadcast (e.g., over a satellite link) to a wide footprint. The aforementioned receiver element receives the geocoded regionally relevant information and filters it using the aforementioned logical fence according to the aforementioned DGFF process. In other words, received information bearing a geocode within the logical fence is kept and processed, while information bearing a geocode falling outside of the logical fence is not kept and processed. The inventive methodology is dynamic in that the fence automatically moves as the mobile environment moves, thereby automatically changing the nature and content of the information that is allowed to pass through the DGFF filter.

The present invention may be implemented using in a wireless distribution system that securely, reliably and inexpensively distributes digital, packetized and regionally relevant information to individuals at geographically disperse and mobile locations. The wireless distribution system is preferably implemented using the up-link and air-link facilities of a known digital satellite broadcast system, such as the satellite-based, digital radio broadcast system utilized by the Sirius Satellite Radio system. Details of such a system are provided several U.S. Patents, including specifically U.S. Pat. No. 5,864,579 entitled Digital Radio Satellite and Terrestrial Ubiquitous Broadcasting System Using Spread Spectrum Modulation. Other patents describing SDARS are U.S. Pat. No. 5,319,673, U.S. Pat. No. 6,023,616, U.S. Pat. No. 5,278,863, U.S. Pat. No. 5,485,485, U.S. Pat. No. 5,592,471, U.S. Pat. No. 5,794,138, U.S. Pat. No. 5,720,039, and U.S. Pat. No. 5,745,839.

The present invention is embodied in a method of providing regionally relevant information to a mobile environment. The steps include receiving at a receiver station of the mobile environment transmitted geographically coded regionally relevant information; and filtering said transmitted geographically coded regionally relevant information based on a current position of said receiver station and a predetermined area around said current position of said receiver station. The mobile environment may be any of a variety of mobile environments, for example, a motor vehicle or a person.

The above-described filtering can comprise determining whether a geographically coded portion of said geographically coded regionally relevant information represents an area falling outside said predetermined area around said current position of said receiver station. The predetermined area is periodically updated when said current position changes.

The filtered regionally relevant information may be placed in a format suitable for presentation to a user. The regionally relevant information can include traffic information, weather information, points of interest, historical information, advertisements, and other types of information The present invention may also be embodied in a system for providing regionally relevant information to a mobile environment. The system includes a central broadcast facility that assembles regionally relevant information and associates with said regionally relevant information geographic coding information identifying a geographic region to which said regionally relevant information is relevant. The central broadcast facility broadcasts said geographically coded regionally relevant information to a coverage area that includes receiver stations each part of a mobile environment and capable of receiving and processing said transmitted geographically coded regionally relevant information. The processing operation includes filtering said transmitted geographically coded regionally relevant information based on a current position of said receiver station and a predetermined area around said current position of said receiver station. The filtering can further include determining whether a geographically coded portion of said geographically coded regionally relevant information represents an area falling outside said predetermined area around said current position of said receiver station. The predetermined area is periodically updated when said current position changes.

BRIEF DESCRIPTION OF THE DRAWINGS

The various features and advantages of the present invention may be more readily understood with reference to the following detailed description taken in conjunction with the accompanying drawings, wherein a single reference numeral may be used in different drawings, said single reference numeral so used designates substantially the same structural or procedural element, and in which.

DETAILED DESCRIPTION OF THE PREFERRED EMBODIMENTS

Figure 1:
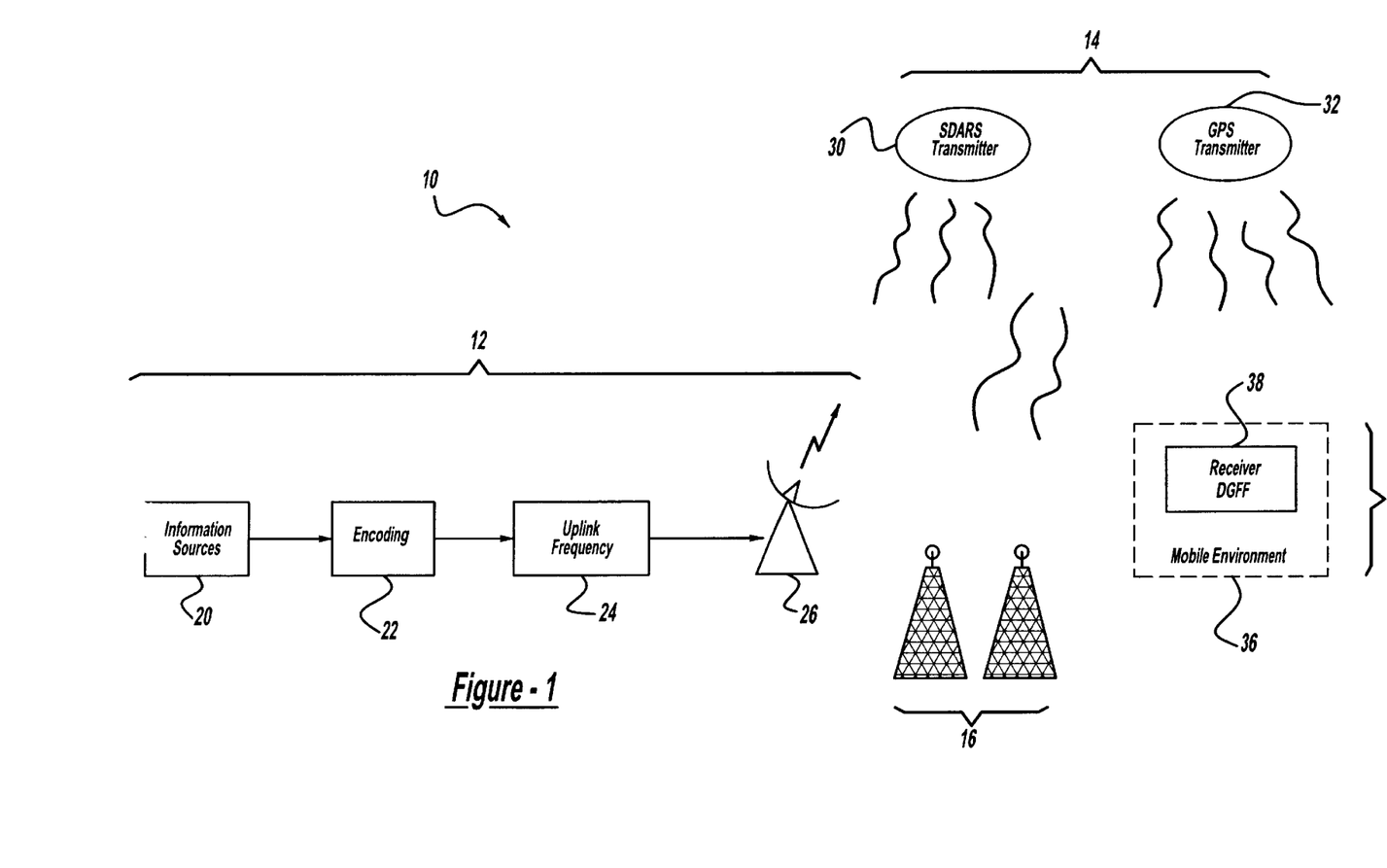
FIG. 1 is a diagram of broadcast satellite system that implements the method and apparatus of the present invention.

Referring to the drawings, FIG. 1 is a block diagram of a satellite-based transmission and reception system 10 that distributes geo-coded, regionally relevant data (GRRD) to a mobile environment, such as an automobile, in accordance with the principles of the present invention. The illustrated system 10 includes a transmission station 12, a relay stage 14, terrestrial repeaters 16 and a plurality of receiver stations, one of which is shown at reference numeral 18. A wireless air-link provides the communications medium between the transmission station 12, the relay stage 14, the repeaters 16 and the receiver stations 18.

The transmission station 12 includes an information source 20, an encoding system 22, an up-link frequency converter 24, and an uplink satellite antenna 26. The relay station 14 is preferably at least one geosynchronous satellite, along with at least one GPS satellite. The receiver station 18 includes a satellite receiver 42 and a GPS receiver 40, both connected to a central processor 44 (all shown in FIG. 2). The central processor 44 may be a so-called telematics communications module (TCM), which generally manages digital data (e.g., VIN, latitude, longitude, direction, speed, etc.) sent over a cellular link to a vehicle. In the present invention, the TCM 44 is modified in accordance with the methodologies described and illustrated herein (see FIGS. 3 and 4) to also manage regionally relevant digital data sent over a satellite link to the mobile environment. In accordance with the present invention, the aforementioned regionally relevant digital data would be geo-coded to associate it with one or more geographic regions, and the aforementioned data management function would include, inter alia, the DGFF operations described herein.

The present invention may be incorporated into any wireless transmission system capable of transmitting and/or broadcasting packetized digital information. Preferably, the present invention is incorporated into a broadcast satellite digital audio radio system (known generally as "SDARS") of the type used commercially by Sirius Satellite Radio. The details of an exemplary SDARS system are described in several U.S. Patents, including specifically U.S. Pat. No. 5,864,579 entitled Digital Radio Satellite and Terrestrial Ubiquitous Broadcasting System Using Spread Spectrum Modulation. Other patents describing SDARS are U.S. Pat. No. 5,319,673, U.S. Pat. No. 6,023,616, U.S. Pat. No. 5,278,863, U.S. Pat. No. 5,485,485, U.S. Pat. No. 5,592,471, U.S. Pat. No. 5,794,138, U.S. Pat. No. 5,720,039, and U.S. Pat. No. 5,745,839. Other possible broadcast systems include direct-to-home satellite television systems of the type used commercially by companies such as DIRECTV and Dish Network. The details of a direct-to-home satellite television system are disclosed in several U.S. Patents, for example U.S. Pat. No. 5,844,636 and U.S. Pat. No. 5,801, 751. The entire disclosure of each patent listed in this paragraph is incorporated herein by reference.

Referring again to FIG. 1, the transmission station 12 can receive information from a number of sources. For example, audio programming can come from other satellites, terrestrial fiber optics, cable, or tape. The regionally relevant information can include traffic, weather, points of interest, restaurants, and other information, gathered from a variety of sources. For example, several companies gather traffic-related information and present it in a single format. A company called TrafficStation provides personalized traffic and traveler information via the Internet, telecommunications (e.g., radio stations) and mobile wireless devices.

The various categories of information are gathered at the source element 20 and sent, along with other related data (e.g., conditional access information for subscription purposes), to the video/audio/data encoding system 22 where they are digitally encoded and multiplexed into a packetized data stream using a number of conventional algorithms, including convolutional error correction and compression. With respect to the so-called "regionally relevant" category of information, the aforementioned "other" information that is added thereto (preferably in the data packet's header) via the encoding system 22 includes geo-codes that tie the regionally relevant information to a particular region. For example, where the regionally relevant information is a popular restaurant in downtown Chicago, that information is encoded or packetized with geo-codes (latitude and longitude data) identifying the location of the popular restaurant. Or, where the regionally relevant information is a road construction project tying up traffic on Interstate 75 between exits 256 and 275, that information is encoded or packetized with one or more geocodes (latitude and longitude data) identifying the various areas that are affected by the traffic delays. Or, where the regionally relevant information is the location and other information about the World Headquarters of Ford Motor Company in Dearborn, Mich., that information is encoded or packetized with one or more geocodes (latitude and longitude data) identifying the location of Ford's World Headquarters.

In a conventional manner, the encoded data stream is modulated and sent through the uplink frequency converter 24 which converts the modulated encoded data stream to a frequency band (e.g., 4–20 GHz) suitable for reception by the SDARS satellite 30. The modulated, encoded data stream is then routed from the uplink frequency converter 24 to an uplink satellite antenna/dish 26 where it is broadcast toward the SDARS satellite 30 over the air-link. The SDARS satellite 30 receives the modulated, encoded data stream and re-broadcasts it downward toward an area on earth that includes the repeaters 16 and the various receiver stations 18.

In addition to the SDARS satellite 30, the relay stage 14 of the system 10 according to the present invention includes a GPS satellite 32. In a conventional manner, the GPS satellite 32 transmits signals (or geo-codes) related to latitude and longitude of a particular area, for example, the continental United States. A GPS receiver 32 (shown in FIG. 2) located on the ground receives the GPS signals from the GPS satellite 32 and converts them into very accurate latitude and longitude data identifying with amazing accuracy the location of the GPS receiver 32.

Figure 2:
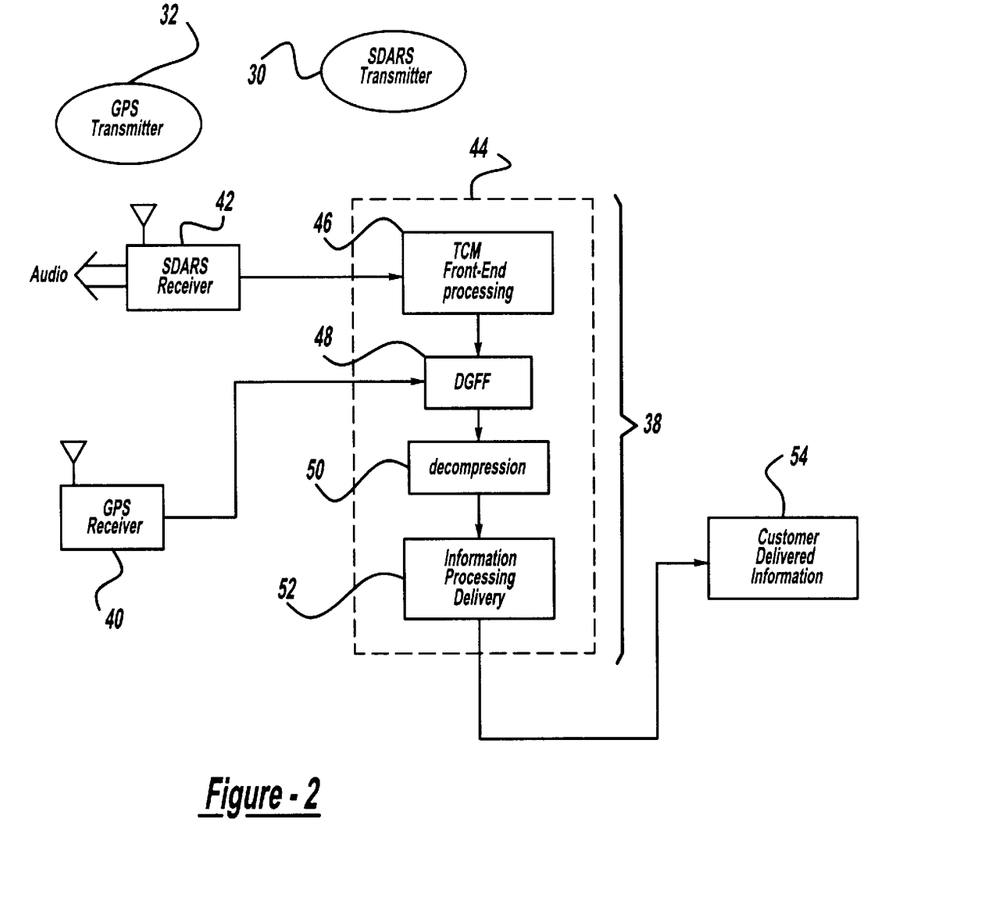
FIG. 2 is a diagram illustrating more details of the receiver station shown in FIG. 1.

FIG. 2 is a diagram illustrating more details of the receiver station 38 shown in FIG. 1. In general, the receiver station 38 includes a GPS receiver 40, an SDARS receiver 42 and a telematics control module (TCM) 44. The TCM 44 includes a front-end processing module 46, a DGFF processing module 48, a decompression module 50, and an information processing module 52.

The GPS receiver 40 receives GPS position signals representing generally the latitude and longitude of the receiver station 38. The received GPS signals are provided to the DGFF module 48 of the TCM 44. In a similar fashion, the SDARS receiver 42 receives the signal from the SDARS satellite 30. A demodulator (not shown) in the SDARS receiver 42 recovers the broadcast streaming packetized data, which has two major component categories, SDARS data and GRRD (geo-coded, regionally relevant data). The SDARS receiver 42 may also perform certain conditional access checks on the incoming signal to make sure that the receiver station 38 is an authorized subscriber to the data service that provides the SDARS data and the GRRD. In general the SDARS audio/data is routed using identifying header information to an audio/data processor (not shown) for processing and outputting the digital audio transmission and its associated data (e.g., song title, artist, music category, etc.). The GRRD is routed, also using identifying header information in each data packet, to the TCM front end processor 46. The TCM processor 46 is a conventional microprocessor that ordinarily receives and processes various types of data inputs received from a cellular receiver (not shown). According to the present invention, the TCM front-end processor 46 is modified to also receive and process the GRRD and pass it to the DGFF module 48.

The DGFF module performs 48 what the present disclosure describes as dynamic geo fencing and filtering, or DGFF. This involves taking the geocode reading (e.g., latitude and longitude) obtained from the GPS satellite 32 via the GPS receiver 40 for identifying the location of the receiver station 38, then logically drawing a fence around that location reading, for example two miles square. The GRRD, which has been tagged with the geocode of the region to which the GRRD is relevant, is filtered using the aforementioned logical fence according to the aforementioned. DGFF process. In other words, received GRRD bearing a geocode within the logical fence is kept and processed, while GRRD bearing a geocode falling outside of the logical fence is not kept and processed. The inventive methodology is dynamic in that the fence automatically moves as the mobile environment moves, thereby automatically changing the nature and content of the information that is allowed to pass through the DGFF filter.

A decompression module 50 receives the filtered GRRD and decompresses it. Digital information is often compressed before broadcasting to conserve bandwidth. Digital video is often compressed according to the so-called "MPEG" compression standards, and audio signals are often compressed using the so-called "MP-3" compression standards. An information processing module 52 receives the decompressed packets and, in a conventional manner, reconstructs the broadcast information. The reconstructed information is then passed to the presentation module 54, which provides the information to the user. This module 54 may be any one of a variety of output devices (e.g., loudspeakers, video/text display) depending on the nature of the GRRD.

Figure 3:
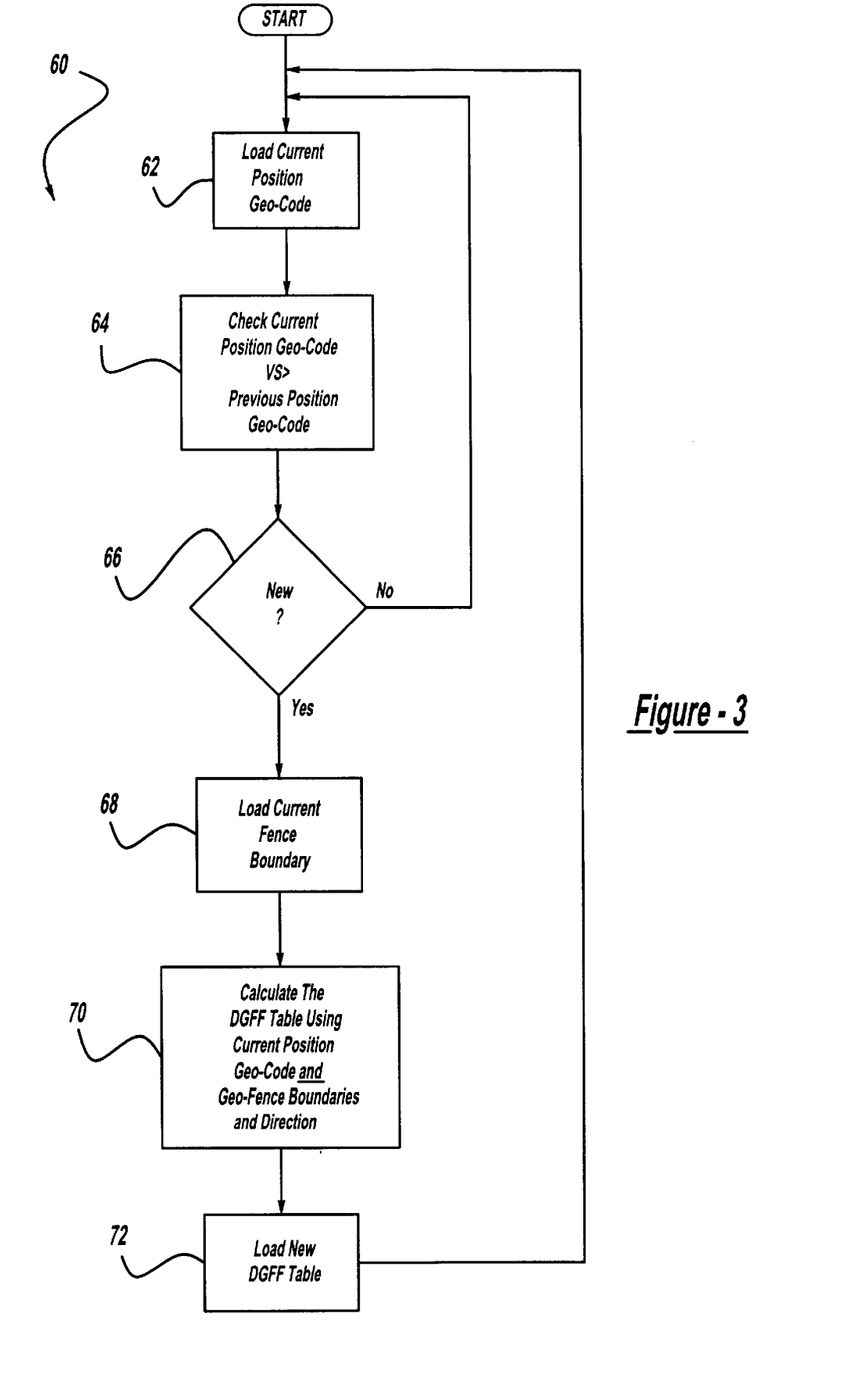
FIG. 3 is a flow diagram illustrating a dynamic geo fencing and filtering (DGFF) process embodying a method of the present invention.
Figure 4:
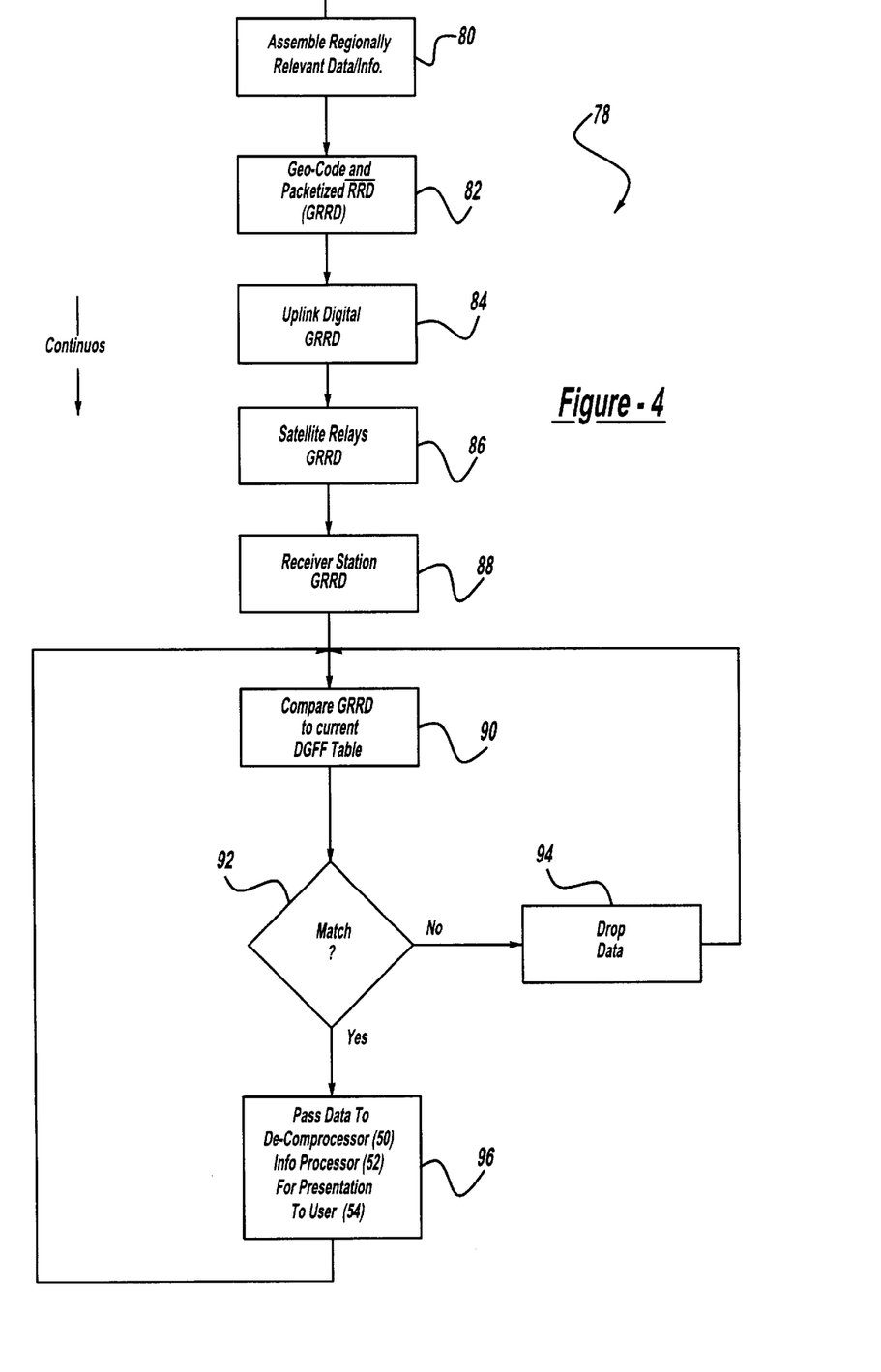
FIG. 4 is another flow diagram illustrating an overall process that incorporates the DGFF process shown in FIG. 3, and that further embodies a method of the present invention.

FIG. 3 is a flow diagram illustrating the DGFF process embodying a method of the present invention. FIG. 4 is another flow diagram illustrating an overall service process, further embodying a method of the present invention, that provides continuous, always-on regionally relevant data to geographically dispersed remote receivers and incorporates the DGFF process shown in FIG. 3. As shown in FIG. 3, the DGFF process 60 begins at block 62 by loading the current GPS geo-code information from the GPS receiver 40. The current geo-code identifies the current position of the receiver station 38. If the receiver station 38 is part of a mobile environment 36 (e.g., a motor vehicle) the current position information may also include the direction in which the mobile environment 36 is heading. At block 64, the current position geo-code is compared with the previous position geo-code. Decision block 66 determines whether the current position geo-code is different from the previous position geo-code, preferably measured within some selected range. If no change is determined at decision block 66, the process 60 returns to block 62 and again loads the current position geo-code. If a change is determined at decision block 66, the process 60 proceeds to blocks 68 and 70 which load the current logical fence boundaries (as predetermined, or as selected by the system user) and calculate a DGFF table using the current position geo-code, the geo-codes corresponding to and covered by the selected logical fence boundaries, and the receiver station's direction, if applicable. The DGFF table, so calculated, will include all the geo codes that fall within the fence boundaries around the current position geo-code. At power-up, the previous position geo-code is cleared to null, thereby forcing the process 60 through steps 68 and 70 at least once at start up. At block 72, the new DGFF table, as calculated at block 70, is loaded to a memory location and made available for use in the overall GRRD broadcast process 78 shown in FIG. 4.

As shown in FIG. 4, the overall GRRD broadcast and DGFF filtering process begins at a block 80 at which regionally relevant information is assembled. The regionally relevant information can include traffic, weather, points of interest, restaurants, and other information, gathered from a variety of sources. For example, in the category of traffic information, several companies gather traffic-related information and present it in a single format (e.g., text, maps, voice, diagrams, still pictures, moving video). A company called ETAK provides personalized traffic and traveler information via the Internet, telecommunications (e.g., radio stations) and mobile wireless devices. At block 82, the regionally relevant information is digitized (or packetized) and associated with a geo-code for the region to which the information is relevant. The geo-code may be placed in the header information of the data packets.

The geo-coded, packetized regionally relevant data (GRRD) is then broadcast at blocks 84 and 86. In the preferred embodiment, the broadcast includes uplinking the GRRD to satellites that relay the GRRD to a coverage area on the ground. An exemplary broadcast system for use with the present invention is disclosed in U.S. Pat. No. 5,864,579 (the entire disclosure of which has been incorporated herein by reference). As described and illustrated in the '579 patent, the broadcast signal, consisting of one or more music, voice or ancillary data programs, originates in a programming center and is sent to a geosynchronous satellite by the Uplink Earth Station using a radio-frequency typically in the 4–20 GHz range. The same transmission may be sent to one or more additional geosynchronous satellites as described in U.S. Pat. No. 5,485,485 to mitigate service outages from multipath fading and blockage. The signal transmitted to the satellite is retransmitted by the satellite to the service coverage area on the earth using a UHF radio-frequency typically in the 0.3–3 GHz range. The geographical service coverage area for such radio broadcast systems is often large (e.g., the contiguous United States).

As shown in FIG. 1 of the '579 patent, mobile and fixed terminals in the service coverage area with clear line of sight to the satellite(s) receive their service directly from the satellite(s). In core urban areas, there will be too much blockage from buildings. Such blockage creates more service outages than would be tolerable to broadcast radio listeners. There is insufficient signal power from the satellite to penetrate reliably modem buildings, so service would be unavailable to listeners in apartments and offices. Such reliable penetration would require satellites over a thousand times more powerful than those now available. Such satellites would be very costly. This problem can be solved by using terrestrial repeaters in the urban cores and in other high blockage situations (e.g., tunnels). The terrestrial repeater receives the low power broadcast signal from the satellite and rebroadcasts the signal at high power. The number of terrestrial repeaters required to provide service throughout a specific core urban area can be one or more, depending on the transmitter radiated power of the terrestrial repeater, the severity of the blockage conditions and the geographical extent of the core urban area desiring service. The terrestrial repeaters, due to their high radiated transmit power, can additionally serve fixed receivers inside modern apartment buildings and offices as well as portable receivers (e.g., Walkman). Thus, a mobile terminal in less dense urban areas can receive good service coverage by intermittently using either the satellite transmission or one of the terrestrial repeater transmissions.

Returning to the overall flowchart description in FIG. 4, block 88 shows the receiver station receiving the GRRD. At block 90, the received GRRD is compared to the current DGFF table that was determined by the DGFF process 60 shown in FIG. 3. More particularly, the geocode in the header information of each packet in the incoming GRRD is compared with the geo-codes in the current DGFF table. If no match is found at block 92, the system concludes that the GRRD is relevant to a geographic region falling outside of the region in which the receiver station 38 is currently located, and the non-matching data packet is therefore allowed to fall on the floor at block 94. If a match occurs at block 92, the system concludes that the GRRD is relevant to a geographic region falling within the region in which the receiver station 38 is currently located, and the matching data packet is therefore passed through at block 96 for re-assembly and processing and presentation to the system user.

Thus, the above detailed description describes an advantageous system that uses data broadcasting and dynamic, geo-code-based filtering and fencing (referred to herein as DGFF) to provide a wide variety of regionally relevant services to a mobile environment. An uplink facility assembles and broadcasts a wide variety of data that is only relevant to individuals in or traveling through a certain geographic region. Prior to broadcast, the regionally relevant data is tagged with a geo-code identifying the region(s) to which it pertains. Receiver stations are provided at geographically dispersed locations, preferably in a mobile environment such as an automobile. The receiver stations continuously receive the GRRD, position data representing its current location, and so-called "fence" information defining an area of interest around the receiver station's (and hence, the automobile's) current location. The system is dynamic in that when the receiver station moves, the fence boundaries are recalculated and changed. The receiver station uses a snapshot of the current dynamic fence boundary information and the receiver's current position to determine whether or not the received GRRD should be kept or discarded. Thus, the present invention provides convenience and simplicity, while avoiding the complexity (connecting a telephony link) and costs (cellular airtime) associated with using a wireless telephony communications path.

Of course, it should be understood that a range of changes and modifications can be made to the preferred embodiment described above. For example, the present invention is described in connection with a particular hardware and processing structure for transmitting and receiving digital audio and related data. However, a wide variety of transmitting and receiving structures could be utilized as long as the essential dynamic geo-code fencing and filtering features described herein are present. Some exemplary transmission media include cable or terrestrial broadcast, LMDS, MMDS, or other similar formats. Also, the invention is described in connection with GPS based geo-codes, however several other geographically coded position data systems would be applicable, including Cellular triangulation and Road-side beacons. It is therefore intended that the foregoing detailed description be regarded as illustrative rather than limiting and that it be understood that it is the following claims, including all equivalents, which are intended to define the scope of this invention.

I claim:

1. A method of providing regionally relevant information to a mobile environment, the method comprising:

receiving, at a receiver station of the mobile environment, transmitted geographically coded regionally relevant information, wherein the information includes different information corresponding to respective ones of a plurality of regions with the information for each region having a respective geographically coded portion which identifies the region; and automatically filtering said transmitted geographically coded regionally relevant information based on a current position of said receiver station and a predetermined area around said current position of said receiver station in order to process the information having geographically coded portions corresponding to regions within the predetermined area around said current position of said receiver station while ignoring the information having geographically coded portions corresponding to regions outside of the predetermined area around said current position of said receiver station.

2. The method of claim 1 wherein said predetermined area is periodically updated when said current position changes.

3. The method of claim 1 wherein processing the information includes placing this information in a format suitable for presentation to a user.

4. The method of claim 3 wherein said regionally relevant information comprises traffic information, weather information, points of interest, historical information or advertisements.

5. The method of claim 3 wherein said format comprises text.

6. The method of claim 3 wherein said format comprises audio.

7. The method of claim 3 wherein said format comprises video.

8. The method of claim 3 wherein said format comprises graphics.

9. The method of claim 1 wherein said mobile environment comprises a motor vehicle.

10. The method of claim 1 wherein said mobile environment comprises a person.

11. The method of claim 1 wherein:

said transmitted regionally relevant information comprises data packets;

said data packets each comprise a header portion and a data portion;

said header portion comprises a geographically coded portion of said geographically coded regionally relevant information; and said data portion comprises said regionally relevant information.

12. The method of claim 11 wherein said geographically coded portions comprise global positioning system geocodes.

13. A method of providing regionally relevant information to a mobile environment, the method comprising:

assembling regionally relevant information at a central location;

associating, with said regionally relevant information, geographic coding information identifying a geographic region to which said regionally relevant information is relevant;

transmitting from said central location said geographically coded regionally relevant information to a coverage area;

said coverage area including receiver stations each part of a mobile environment and capable of receiving and automatically processing said transmitted geographically coded regionally relevant information; and said processing comprising filtering said transmitted geographically coded regionally relevant information based on a current position of said receiver station and a predetermined area around said current position of said receiver station in order to process the information having geographic coding information corresponding to geographic regions within the predetermined area around said current position of said receiver station while ignoring the information having geographic coding information corresponding to geographic regions outside of the predetermined area around said current position of said receiver station.

14. The method of claim 13 wherein said predetermined area is periodically updated when said current position changes.

15. A system for providing regionally relevant information to a mobile environment comprising:

a receiver station of the mobile environment capable of receiving transmitted geographically coded regionally relevant information, wherein the information includes different information corresponding to respective ones of a plurality of regions with the information for each region having a respective geographically coded portion which identifies the region; and a filtering module of said receiver station that automatically filters said transmitted geographically coded regionally relevant information based on a current position of said receiver station and a predetermined area around said current position of said receiver station in order to process the information having geographically coded portions corresponding to regions within the predetermined area around said current position of said receiver station while ignoring the information having geographically coded portions corresponding to regions outside of the predetermined area around said current position of said receiver station.

16. The system of claim 15 wherein said predetermined area is periodically updated when said current position changes.

17. The system of claim 15 wherein:

said transmitted regionally relevant information comprises data packets;

said data packets each comprise a header portion and a data portion;

said header portion comprises a geographically coded portion of said geographically coded regionally relevant information; and said data portion comprises said regionally relevant information.

18. A system for providing regionally relevant information to a mobile environment, the method comprising:

a central broadcast facility that assembles regionally relevant information and associates with said regionally relevant information geographic coding information identifying a geographic region to which said regionally relevant information is relevant;

said central broadcast facility broadcasting said geographically coded regionally relevant information to a coverage area;

said coverage area including receiver stations each part of a mobile environment and capable of receiving and automatically processing said broadcasted geographically coded regionally relevant information; and said processing comprising filtering said transmitted geographically coded regionally relevant information based on a current position of said receiver station and a predetermined area around said current position of said receiver station in order to process the information associated with geographic coding information corresponding to geographic regions within the predetermined area around said current position of said receiver station while ignoring the information associated with geographic coding information corresponding to geographic regions outside of the predetermined area around said current position of said receiver station.

19. The system of claim 18 wherein said predetermined area is periodically updated when said current position changes.

* * * * *